(12) United States Patent
Shirvani

(10) Patent No.: US 6,562,226 B1
(45) Date of Patent: May 13, 2003

(54) ELECTROCHEMICAL MACHINING METHOD

(75) Inventor: Hassan Shirvani, Chlemsford (GB)

(73) Assignee: Anglia Polytechnic University (GB)

( * ) Notice: Subject to any disclaimer, the term of this patent is extended or adjusted under 35 U.S.C. 154(b) by 0 days.

(21) Appl. No.: 09/857,526

(22) PCT Filed: Dec. 9, 1999

(86) PCT No.: PCT/GB99/04134

§ 371 (c)(1),
(2), (4) Date: Jul. 30, 2001

(87) PCT Pub. No.: WO00/33996

PCT Pub. Date: Jun. 15, 2000

(30) Foreign Application Priority Data

Sep. 12, 1999 (GB) .............................................. 9827116

(51) Int. Cl.⁷ .......................... B23H 3/00; C25D 17/00; C25B 11/00
(52) U.S. Cl. ...................... 205/649; 205/648; 205/652; 205/654; 205/655; 204/224 M; 204/288; 204/289
(58) Field of Search .......................... 204/224 M, 289, 204/288; 205/652, 654, 665, 666, 668, 648, 649

(56) References Cited

U.S. PATENT DOCUMENTS 3,085,895 A * 4/1963 Williams ..................... 204/143
3,849,272 A * 11/1974 Zubak ................... 204/224 M

FOREIGN PATENT DOCUMENTS

| EP | 0767026 | 4/1997 |
| GB | 1249436 | 10/1971 |
| GB | 2270644 | 3/1994 |

* cited by examiner

Primary Examiner—Nam Nguyen
Assistant Examiner—Thomas H. Parsons
(74) Attorney, Agent, or Firm—Dann, Dorfman, Herrell and Skillman, P.C.

(57) ABSTRACT

An electrochemical machining process gives a workpiece such as a honeycomb panel a 3-dimensional profile form having a varying cross-section perpendicular to an axis of the profile form. In the process an electrode is maintained in a constant position relative to the axis and the surface of the profile form is exposed differentially to the action of the electrode in the axial direction to vary the amount of material removal and so vary the cross-section.

12 Claims, 3 Drawing Sheets

ELECTROCHEMICAL MACHINING METHOD

FIELD OF THE INVENTION

The present invention relates to a method of electrochemical machining.

BACKGROUND OF THE INVENTION

Electrochemical machining enables the formation of complicated shapes. In a conventional electrochemical machining process, a shaped electrode and a workpiece are positioned in an electrolyte bath. The electrolyte is continuously replenished and a potential is applied across a gap between the electrode and the workpiece. The electrode is then fed towards the workpiece. Material is electrochemically dissolved from the surface of the workpiece in accordance with Faraday's Law, so that the surface of the workpiece erodes in proportion to the local current density. Those parts of the workpiece which are closest to the electrode erode fastest, so that as the electrode is fed towards the workpiece it eventually adopts a surface morphology which is determined by the shape of the electrode (as well as other factors such as the feed rate, potential, and total current density).

On the other hand, wet chemical etching is sometimes used when it is desired to uniformly erode surface material, e.g. for thinning the wall thicknesses of honeycomb structures. Using this process, material removal is uniform over all the exposed surfaces of the honeycomb.

Honeycomb structures are used in many engineering applications which require a combination of lightness and strength, e.g. as a core material for structural panels of vehicles. Typically such structures have cells with hexagonal cross-sections arranged in a hexagonal array. However, other cross-sections, such as circular, square or triangular, are also possible; and other arrangements of cells can also be used, e.g. a square arrangement.

Aluminium honeycomb panels are used as crash energy absorbers in vehicle impact testing rigs. When a vehicle impacts into such a panel, the kinetic energy of the vehicle is absorbed by controlled crumpling and deformation of the honeycomb cells. The energy is absorbed in an almost entirely plastic manner with little elastic recoil, so that the amount of deformation is an accurate measure of the energy of the impact.

The deformation resistance is of course dependent on the wall thickness of the honeycomb, and the deformation resistance of a honeycomb panel can be reduced by wet etching. This can be done, for example, where it is required to vary the energy-absorbing properties of such a panel through the thickness of the panel. Two or more honeycombs with different wall thicknesses are bonded together to form a multi-layer panel, each layer having cell walls of a different thickness.

Significantly, however, the interfaces between adjacent layers form discontinuities which disturb the otherwise controlled deformation of the panel on impact. This reduces the accuracy with which the amount of energy absorption can be measured.

SUMMARY OF THE INVENTION

The present invention is concerned with the use of electrochemical machining or electrochemical etching to give a cell of a honeycomb structure a cross-section that varies in size in the direction perpendicular to that cross-section, i.e. along the axis of the cell.

The present invention provides an electrochemical machining process for giving a cell of a honeycomb structure a 3-dimensional profile form having a varying cross-section perpendicular to the axis of the cell, in which process an electrode is maintained in a constant position relative to said axis and the surface of the cell is exposed differentially to the action of the electrode in the axial direction to vary the amount of material removal and so vary said cross-section.

An advantage of this process over conventional electrochemical machining is that differential material erosion can be effected even without feeding the electrode towards the eroding surface, although the amount of erosion will decrease as the gap between the electrode and the eroding surface increases.

In one form of the invention, to give the required variation the electrode may be held stationary and screening means can selectively screen the surface of the cell from the action of the electrode.

In another form of the invention, the electrode can be moved relative to the workpiece along said axis to give the required variation.

In a further form of the invention, to give the required variation the electrode can be shaped to provide a gap between the electrode and the surface of the cell, the gap having a varying thickness perpendicular to said axis.

The present invention finds particular application for the production of honeycomb panels (e.g. made of aluminium or aluminium alloy) having honeycomb cell wall thicknesses which vary in the axial direction of the cells.

To machine a honeycomb cell or cavity, preferably the electrode is elongate and oriented parallel to the axis of the cavity, and has a cross-sectional shape which corresponds to the cross-sectional shape of the cavity. The erosion rate can then be controlled to occur at the same rate around the periphery of the cavity, even in cylindrical cavities of non-circular cross-section such as hexagonal honeycomb cells.

The cell wall thicknesses of the honeycomb can be varied for all or some of the cells so that the energy-absorbing properties of the honeycomb vary in a progressive and determinate manner through the thickness of honeycomb. An advantage over conventional honeycomb panels formed from layers of honeycombs is that it is possible to avoid forming discontinuities which affect the energy absorbing properties of the wall.

A preferred method of the present invention is particularly suitable for the machining of the walls of honeycomb cells where the cells are irregularly shaped and spaced. Irregularly shaped and spaced cells result from nature of the adhesive bonding process used to make e.g. aluminium honeycombs. Irregularly shaped and spaced cells make it more difficult to (a) centre the electrode in any particular cell, and (b) ensure that uniform erosion takes place around the periphery of the cell.

Therefore, the preferred method includes inserting one or more wedging fingers in respective neighbouring cells, the wedging fingers being spaced from the electrode and engaging with the walls of their respective cells so that the honeycomb structure is locally forced to become regular and the electrode is maintained at the axis of its cell.

Preferably the support fingers are tapered to facilitate their insertion into their respective cells.

The present invention also encompasses an apparatus for electrochemical machining a honeycomb structure, the apparatus including at least one elongate electrode and one or more wedging fingers spaced from the electrode. When the honeycomb has hexagonal cells, preferably the or each electrode is surrounded by six wedging fingers which form the vertices of a regular hexagon centred on the electrode.

Preferably the apparatus further includes means for applying an electrical potential between the electrode and the honeycomb structure, and means for supplying a flow of electrolyte to the gap between the electrode and the surface of a honeycomb cell. Additionally, the apparatus has (a) means for providing along the axis of the cell relative movement between the electrode and the cell and/or (b) means for selectively screening the surface of the cell from the electrode. The means for selectively screening the surface of the cell may include an insulating sleeve, for occupying a corresponding gap between the electrode and the surface of the cell, and means for providing along said axis relative movement of the sleeve and the honeycomb structure.

The present invention further encompasses a honeycomb structure which has been electrochemically machined by the process of the invention so that the walls of some or all of the cells vary in thickness in the axial direction of the cells.

The present invention will now be described in relation to specific embodiments and with reference to the accompanying drawings, in which:

DETAILED DESCRIPTION

Figure 1:
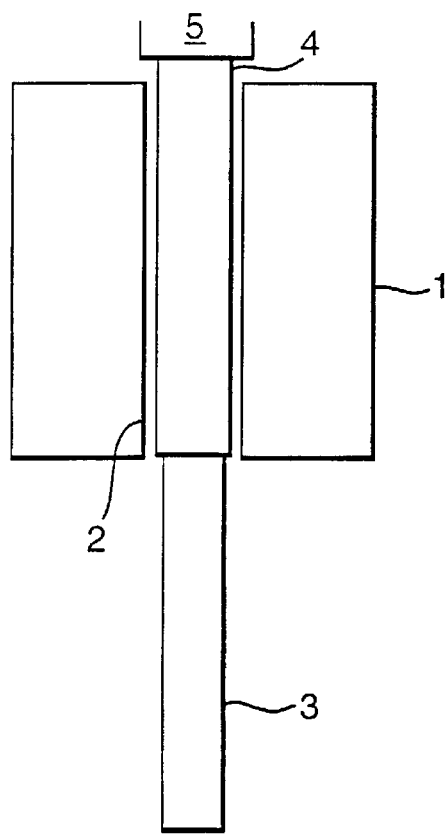
FIG. 1 shows a schematic longitudinal cross-section through a workpiece and electrode tool.

FIG. 1 shows a schematic longitudinal section through a honeycomb structure workpiece 1 which has a cylindrical cell cavity 2. A cylindrical electrode 3, twice as long as cavity 2, is connected to means 5 for translating the electrode and is positioned at the axis of cavity 2 with a gap between the electrode and the cavity. The translating means also supplies power to the electrode 3. An insulating sleeve 4 surrounds the upper half of electrode 3 so that in the electrode start position, cavity 2 is shielded from electrode 3. Translating means 5 also supplies a flow of electrolyte to the electrode. The electrolyte flows along a passage at the centre of the electrode to pass through holes (not shown) to the exterior of the electrode.

Figure 2:
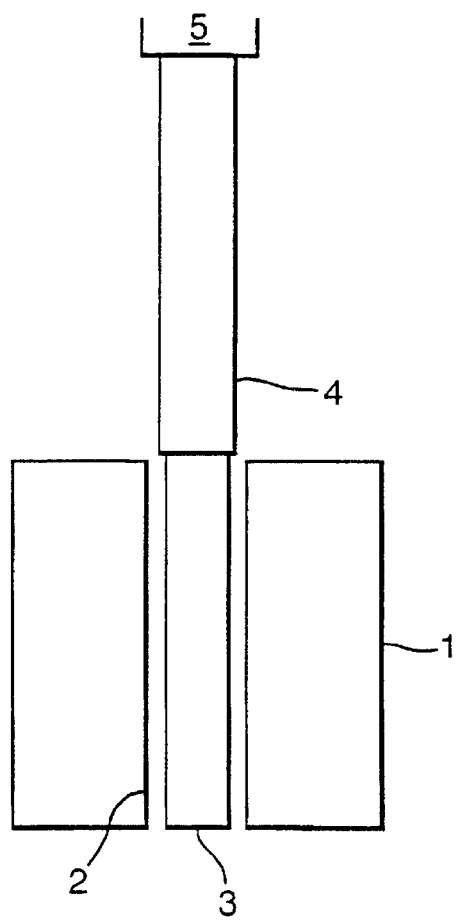
FIG. 2 shows a schematic longitudinal cross-section through the workpiece and tool of FIG. 1 after the tool has been translated through the workpiece.

Electrode 3 is activated by applying a potential between the workpiece 1 and electrode, and the flow of electrolyte through the electrode is started. The electrode is then drawn through cavity 2 at a constant speed until the midpoint of the electrode (i.e. where it emerges from the insulating sleeve 4) is moved from one end of the cavity to the other. FIG. 2 shows the midpoint of the electrode having reached the other end of the cavity. The electrode is then deactivated. During the passage of the electrode through cavity 2, electrolyte flows out of the electrode to continually replace the electrolyte in the space between the electrode and the walls of the cavity.

Any particular location on the wall of cavity 2 is confronted by the activated electrode for a period of time which is proportional to the axial distance of that location from the first end of the cavity. Therefore, an amount of erosion is produced which varies proportionately from one end of the cavity to the other.

A variation on this embodiment involves maintaining electrode 3 in a fixed position relative to workpiece, and translating insulating sleeve 4 (using an adapted translating means 5) from one end of the electrode to the other. This can produce exactly the same erosion profile in the cavity.

Figure 3:
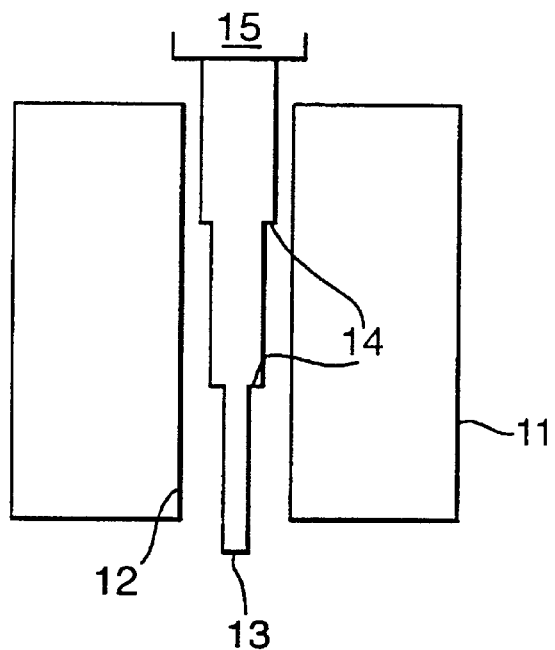
FIG. 3 shows a schematic longitudinal cross-section through a workpiece and a second embodiment of the tool.

In a second embodiment, shown in FIG. 3, activated electrode 13 is held in a fixed central position in cylindrical cavity 12 of workpiece 11. Supply means 15 provides the electrical power to electrode 13 as well as the supply of electrolyte which again flows through a passage at the centre of the electrode to pass through holes (not shown) to the exterior of the electrode. In this embodiment the electrode does not have a uniform cross-section. The cross-sectional area of the electrode decreases from one end of the electrode to the other at a series of steps 14.

Where the walls of cavity 12 confront the widest parts of electrode 13 the highest rate of material erosion occurs because here the gap between electrode and eroding surface is smallest. Therefore, a variation from one end of the cavity to the other in the amount of material removed is again produced. However, because of the presence of steps 14, the amount of material removed does not vary as smoothly as in the first embodiment.

Figure 4:
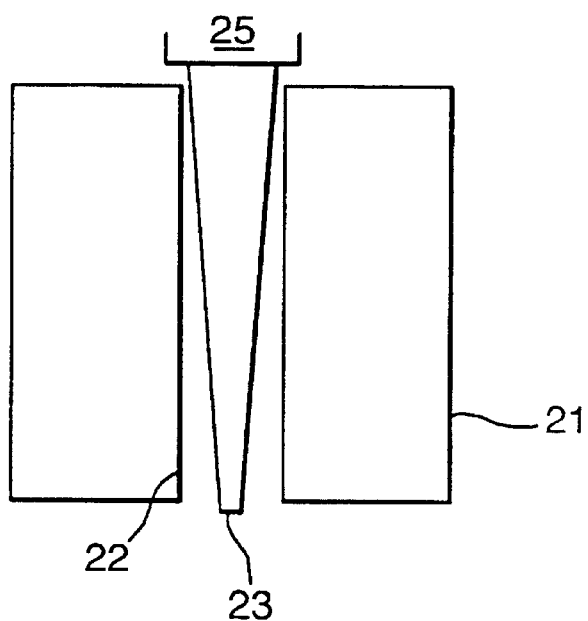
FIG. 4 shows a schematic longitudinal cross-section through a workpiece and a third embodiment of the tool.

This disadvantage is overcome in a third embodiment, shown in FIG. 4, which differs from the second embodiment in that electrode 23 (situated in cylindrical cavity 22 of workpiece 21) is tapered from one end to the other. Supply means 25 provides the electrical connection for electrode 23 and also supplies the electrolyte. The smoothly varying cross-section of the electrode produces a correspondingly smooth variation in amount of material removal from one end of the cavity 22 to the other.

Typical parameters for the electrochemical machining process are an applied voltage of 10 to 20 volts DC and a gap distance of approximately 1 mm between electrode and the workpiece surface which is being machined. The electrode may be of brass or copper. A typical electrolyte is an aqueous solution of NaCl or $NaNO_3$, e.g. 30 to 40 wt % $NaNO_3$ aqueous solution. It is desirable to maintain a high flow rate of electrolyte in the electrode-workpiece gap so that overheating, short circuiting and electrolyte composition changes can be avoided.

Figure 5:
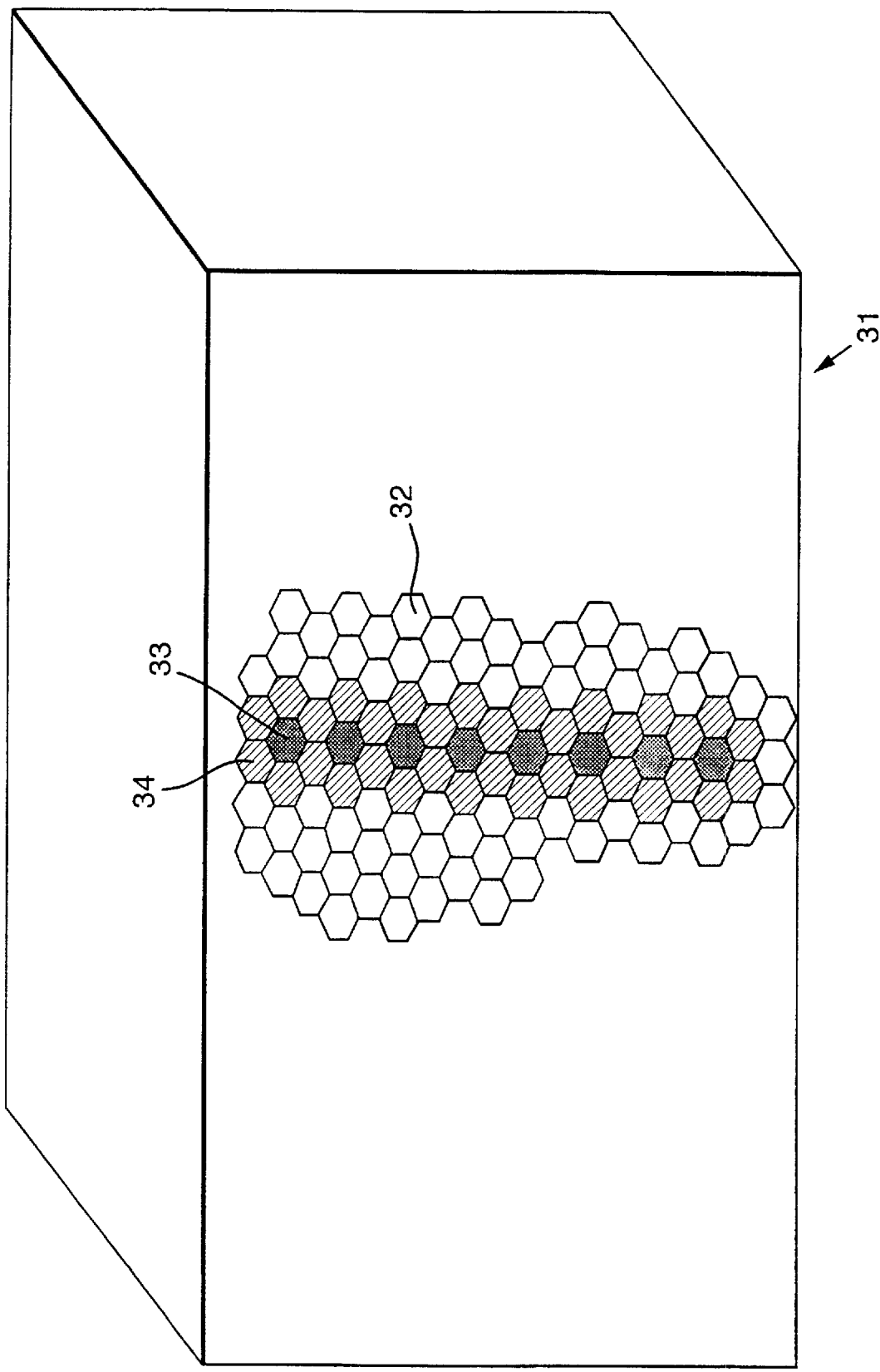
FIG. 5 shows a schematic honeycomb panel.

FIG. 5 shows schematically an aluminium honeycomb 31 with hexagonal cells 32 (of course other cell shapes are possible, such as circular cross-section cells). An apparatus (not shown) for electrochemically machining the cell walls of the honeycomb has eight cylindrical electrodes. The electrodes are spaced apart so that they can be inserted simultaneously into eight next-nearest neighbour cells 33 (indicated shaded black), the cells being arranged along a line. Thirty-four polypropylene wedging fingers are spaced around the electrodes so that they can be simultaneously inserted into all the neighbouring cells 34 (indicated with hatching) of the eight cells 33.

The wedging fingers are tapered to facilitate their insertion into cells 34 and have a hexagonal cross-section. On insertion they engage to the walls of cells 34 to enforce regular hexagonal cross-sections for cells 34. This also has the effect of making regular the hexagonal cross-sections and spacing of cells 33. Therefore, when the electrodes are inserted into cells 33, the electrodes can be centred to the axes of their respective cells 33 and can have uniform gap spacings to the periphery of their respective cells.

Electrochemical machining is then carried out on cells 33. Preferably the electrodes are of the tapered type described in the third embodiment to produce a smoothly varying amount of material removal. When cells 33 have been machined, the electrodes and wedging fingers are withdrawn and displaced sideways to bring the electrodes into alignment with another line of 8 next-nearest neighbour cells.

In this way all the cells of the honeycomb can be machined in successive batches of eight, the resulting honeycomb having cell thicknesses which vary smoothly in thickness from one side of the honeycomb to the other.

What is claimed is:

1. An electrochemical machining process for giving a cell of a honeycomb structure a 3-dimensional profile form having a varying cross-section perpendicular to the axis of the cell, in which process an electrode is maintained in a constant position relative to said axis and the surface of the cell is exposed differentially to the action of the electrode in the axial direction to vary the amount of material removal and so vary said cross-section.

2. A process according to claim 1, in which the electrode is shaped to provide a gap between the electrode and the surface of the cell, the gap having a varying thickness perpendicular to said axis.

3. A process according to claim 1, in which the electrode is held stationary and the surface of the cell is selectively screened from the action of the electrode.

4. A process according to claim 1, in which the electrode is moved relative to the cell along said axis to vary said cross-section.

5. A process according to any one of claims 1 to 4, in which, the electrode is elongate and oriented parallel to said axis, and has a cross-sectional shape which corresponds to the cross-sectional shape of the cell.

6. A process according to any one of claims 1 to 4, including inserting one or more wedging fingers in respective neighbouring cells, the wedging fingers being spaced from the electrode and engaging with the walls of their respective cells so that the honeycomb structure is locally forced to become regular and the electrode is maintained at the axis of its cell.

7. A process according to claim 6, in which the wedging fingers are tapered to facilitate their insertion into their respective cells.

8. An apparatus for electrochemically machining a honeycomb structure, including at least one elongate electrode and one or more wedging fingers spaced from the electrode.

9. An apparatus according to claim 8, in which the or each electrode is surrounded by six wedging fingers which form the vertices of a regular hexagon centered on the electrode.

10. An apparatus according to claim 8 or 9, further including means for applying an electrical potential between the electrode and the honeycomb structure, means for supplying a flow of electrolyte to the gap between the electrode and the surface of a honeycomb cell, and (a) means for providing along the axis of the cell relative movement between the electrode and the cell and/or (b) means for selectively screening the surface of the cell from the electrode.

11. An apparatus according to claim 10, in which the means for selectively screening the surface of the cell includes an insulating sleeve for occupying a corresponding gap between the electrode and the surface of the cell, and means for providing along said axis relative movement of the sleeve and honeycomb structure.

12. A honeycomb structure which has been electrochemically machined by the process of any one of claims 1 to 4, so that the walls of some or all of the cells vary in thickness in the axial direction of the cells.

\* \* \* \* \*